United States Patent [19]

Tanner

[11] 4,096,770
[45] Jun. 27, 1978

[54] METHOD AND APPARATUS FOR MODIFYING THE POSITION OF A MACHINE SLIDE TO COMPENSATE FOR DIFFERENT FOLLOWING ERRORS

[75] Inventor: Randall Curtis Tanner, Lebanon, Ohio

[73] Assignee: Cincinnati Milacron Inc., Cincinnati, Ohio

[21] Appl. No.: 803,566

[22] Filed: Jun. 6, 1977

[51] Int. Cl.² .......................... B23B 1/00; B23B 5/46
[52] U.S. Cl. ...................................... 82/1 C; 82/2 B; 82/5; 318/571
[58] Field of Search ............................ 82/5, 2 B, 1 C; 318/571

[56] References Cited

U.S. PATENT DOCUMENTS

| | | | |
|---|---|---|---|
| 3,381,557 | 5/1968 | Dunn | 82/5 |
| 3,595,106 | 7/1971 | Pomella et al. | 82/2 B |
| 3,725,651 | 4/1973 | Cutler | 82/2 B |
| 3,817,129 | 6/1974 | Nishimura et al. | 82/5 |
| 3,949,285 | 4/1976 | Rosshirt | 318/571 |
| 3,987,350 | 10/1976 | Pomella et al. | 318/571 |

*Primary Examiner*—Leonidas Vlachos
*Attorney, Agent, or Firm*—C. Richard Eby

[57] ABSTRACT

On a machine having a cutting tool moving relative to a rotating workpiece, a method and apparatus are disclosed for holding a constant relationship between the cutting tool and an angular position of the workpiece for different velocities of the cutting tool which produce correspondingly different following errors. The invention is applicable to a numerically controlled turning machine of the type maintaining a constant initial contact point between the cutting tool and an angular position of a rotating workpiece in response to a constant following error during successive machining passes. A first machining pass is executed in response to a first velocity signal which causes the cutting tool to initially contact the rotating workpiece at a first angular position thereof. Before the execution of a subsequent machining pass, the velocity signals associated with the first and subsequent machining passes are used to calculate the difference in following errors between machining passes. The cutting tool is moved through a displacement corresponding to the difference in following errors after which the subsequent machining pass is executed. By changing the starting point of the subsequent machining pass as a function of the difference in following errors, the cutting tool in executing the subsequent machining pass will initially contact the rotating workpiece at the first angular position of the workpiece defined by the first machining pass.

14 Claims, 6 Drawing Figures

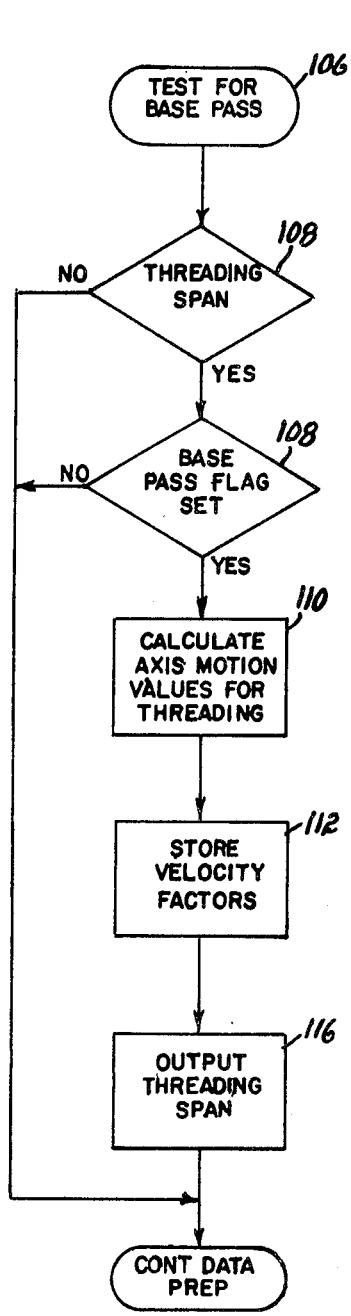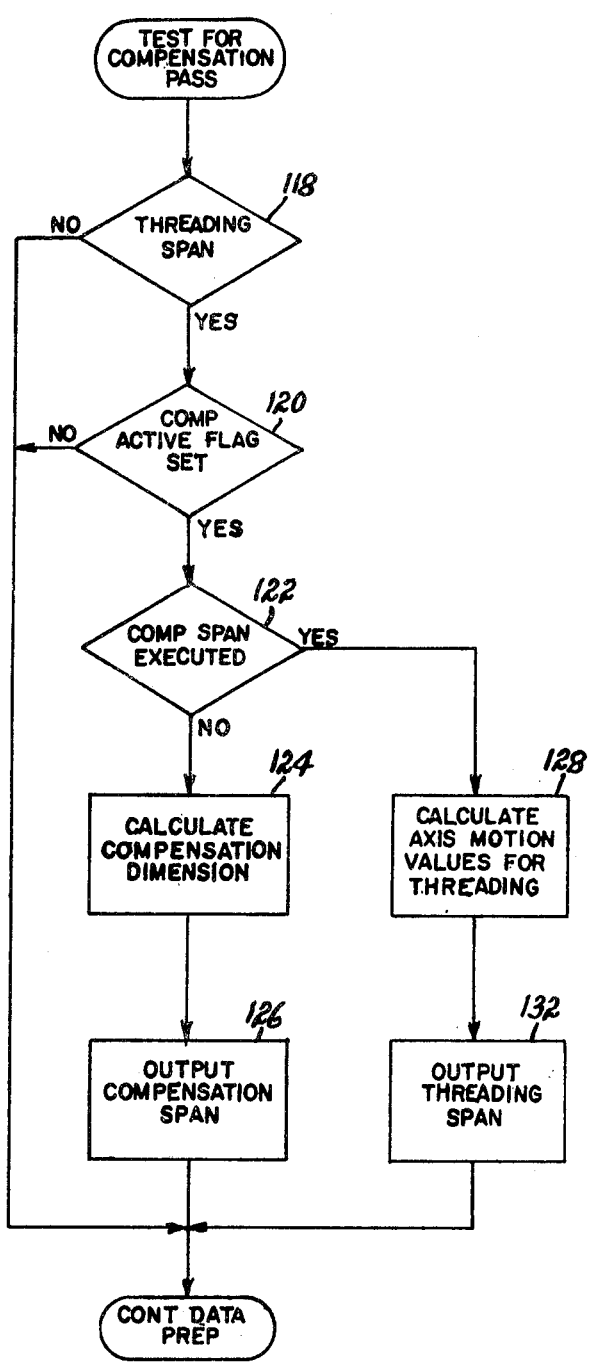
Fig. 5
Fig. 6

METHOD AND APPARATUS FOR MODIFYING THE POSITION OF A MACHINE SLIDE TO COMPENSATE FOR DIFFERENT FOLLOWING ERRORS

BACKGROUND OF THE INVENTION

The invention relates generally to the area of servo-mechanism control circuits. Specifically, the invention provides a method and apparatus for causing a cutting tool to initially contact a rotating workpiece at the same angular position of the workpiece independent of the velocity of the cutting tool.

In numerically controlled machine tools, a cutting tool is moved relative to a workpiece through a pattern of motions defined by a number of predetermined input signals. Typically, the input signals are divided into blocks of signals. Each block of signals defines a change in position and velocity of the cutting tool over a segment of the pattern of motions. The numerical control responds to the input signals and produces command signals to a servomechanism circuit which controls the operation of the cutting tool.

In every servomechanism, there is an error defined by the inherent lag between the input and output which is a function of the rate of variation of the input. The terms following error, a velocity lag error or a steady state error are used interchangably to define this error. For purposes of this disclosure, the term following error will be used to identify the error condition defined in this paragraph. In a numerical control, the input represents a displacement of the cutting tool; and therefore, the rate of variation of the input corresponds to velocity. Restating the above-definition relative to numerically controlled machine tools, the following error is defined by the lag between the desired position of the cutting tool and its actual position; and the following error is proportional to the velocity of the cutting tool.

In most situations, the change in relative position between the cutting tool and the workpiece due to variations in the following error does not affect the quality of the machining process. However, there is at least one exception to the general rule in the which the disclosed method and apparatus will provide an improved machining process.

The preferred embodiment discloses a thread cutting operation. In cutting a thread on a turning machine, the numerical control causes a single point cutting tool to move iteratively through a number of thread cutting passes over the rotating workpiece. The total depth of cut is increased with each pass; and when the final thread depth is achieved, the cycle of iterative motion is terminated.

Typically, on a thread cutting numerically controlled turning machine, a transducer is connected to the rotating spindle holding the workpiece; and a spindle signal is generated therefrom which represents the angular velocity of the spindle. The numerical control uses the spindle signal in conjunction with a programmed input signal defining the thread lead to generate command pulses to a servomechanism circuit for controlling the motion of the cutting tool relative to the rotating workpiece. At least once every revolution, an index for gating pulse is generated from the spindle signal. With each iterative cutting pass, the cutting tool is moved to the same start point; and the index pulse is used to initiate motion of the cutting tool relative to the rotating workpiece. Therefore, with each cutting pass the cutting tool makes contact with the workpiece at approximately the same angular position of the workpiece.

In the prior art systems, the spindle speed remained constant through all the thread cutting passes. This was required because a change in spindle speed would cause a corresponding change in the velocity of the cutting tool thereby changing the following error. Further, the change in following error would cause the cutting tool to initially contact the workpiece at a different angular position, and consequently, the cutting tool would not track the threading groove created by a previous thread cutting pass thereby ruining the workpiece.

Due to the fragile nature of a thread cutting tool, the rough thread cutting passes are executed at a relatively low spindle speed. However, during a finish thread cutting pass, the depth of cut is minimal; and it is desirable to increase the spindle speed and therefore the velocity of the cutting tool to improve the surface finish and efficiency of the process. With the prior art systems, the increase in following error resulting from the increased velocity would cause a loss of synchronization between the cutting tool and the threading start point on the workpiece. Consequently, a constant spindle speed had to be used during the whole thread cutting operation. However, the disclosed method and apparatus permits a spindle speed change without a loss of synchronization between the cutting tool and the threading start point. Therefore, the surface finish of the final thread and the efficiency of the overall process is improved.

SUMMARY OF THE INVENTION

According to one embodiment of the invention, a method and apparatus are disclosed for use with a numerically controlled turning machine which is operative to maintain a constant initial contact point between a cutting tool and an angular position of a rotating workpiece in response to a constant following error during successive machining passes. Said numerical control generates command signals in response to input signals to cause a servomechanism circuit to move the cutting tool relative to the rotating workpiece. The input signals include a position signal representing a desired change in position of the cutting tool and a velocity signal representing a desired velocity of the cutting tool. The improvement is comprised of a method and apparatus for moving the tool through a first machining pass in response to first velocity and position signals whereby the tool initially contacts the rotating workpiece at a first angular position of the workpiece. The first velocity signal and a subsequent velocity signal for a subsequent machining pass are used to generate a compensation signal representing the difference in following errors between the first and subsequent velocity signals. Command signals are generated to cause the servomechanism circuit to move the tool as a function of the compensation signal. Finally, further command signals are generated in response to a subsequent position signal and the subsequent velocity signal to cause the servomechanism circuit to move the cutting tool through the subsequent machining pass whereby the cutting tool initially contacts the rotating workpiece at the first angular position defined during the first machining pass.

BRIEF DESCRIPTION OF THE DRAWINGS

FIG. 5 is a detailed flow chart of a routine for testing for a base machining pass in a following error compensation cycle.

FIG. 6 is a detail flow chart of a routine for testing for a compensation machining pass in a following error compensation cycle.

DESCRIPTION OF THE PREFERRED EMBODIMENT

Figure 1:
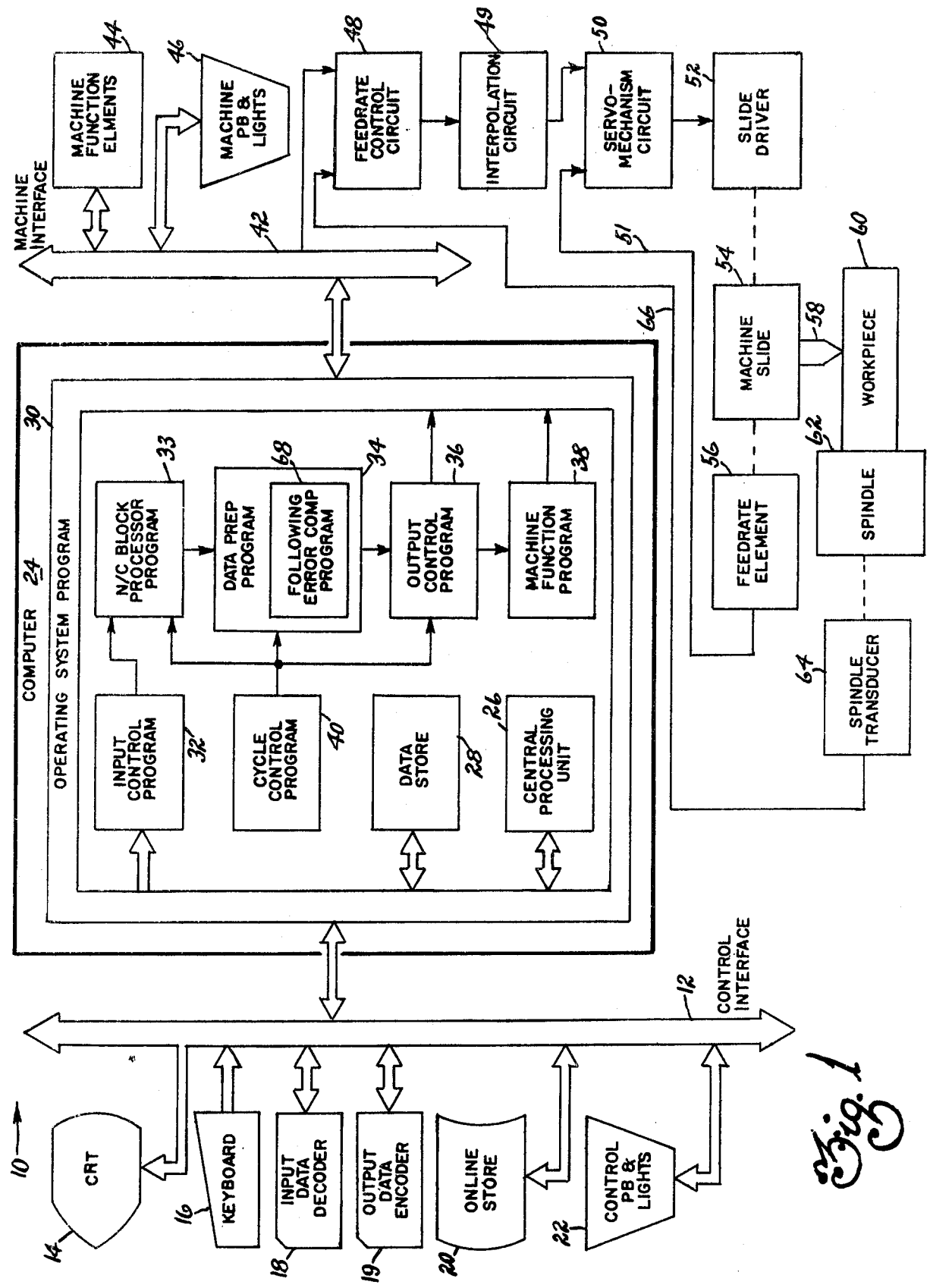
FIG. 1 is a general block diagram illustrating the parts of a turning machine and numerical control system in which the invention may be embodied.

FIG. 1 is a general block diagram illustrating the basic components of a computer numerical control which are pertinent to the disclosed invention and in which the invention may be embodied. The elements as shown are those used in an ACRAMATIC computer numerical control manufactured by Cincinnati Milacron Inc. However, the exact definition and association of these elements may vary from one numerical control to another; and the disclosed invention may be implemented in any of the available computer numerical controls. Therefore, the exact details of the association of the elements shown in FIG. 1 should not be considered as limitations on the claimed method and apparatus.

The numerical control is shown generally at 10. Information is transferred into and out of the control by peripheral devices connected to a control interface 12. Such peripheral devices include a cathode ray tube 14, keyboard 16, input data decoder 18, output data encoder 19 on-line storage unit 20 and control push buttons and lights 22. The input information is processed by a computer 24 including a central processing unit 26, data store 28 and a program store containing a number of specific programs. The flow of information into and out of the computer as well as its overall operation is controlled by an operating system program 30. This program is generally a function of the particular computer used and is relatively independent of the application of the computer.

An input control program 32 controls the transfer of input information from a particular source connected to the control interface to a buffer data store in the computer. The input information is received by the N/C block processor program 33 which reads the information from the buffer store, performs error checks for syntax and executes the appropriate code conversions, e.g. BCD to binary, etc. The data preparation program 34 processes all axis motion information. This program calculates span length, feed rate information, controls the interpolation mode and controls optional features which influence axis motion, e.g. tool offsets, tool length compensation, etc. After data preparation is complete, an output control program 36 receives all the processed information and separates the axis motion information from machine function control information. In addition to transferring the machine function control information to a machine function program 38, the output control program 36 controls the sequence of occurrence of machine functions relative to the axis motions. A cycle control program 40 controls the serial sequence of operations of the N/C block processor program 33, data preparation program 34 and output control program 36.

Machine function control information is transferred under the control of the operating system program 30 to and from a machine interface 42. The machine interface 42 distributes process information to and receives input information from the specific machine function elements 44 and machine push buttons and lights 46. At times determined by the operating system program 30, axis motion information is transferred by the output control program 36 through the machine interface 42 to feed rate control and interpolation circuits 48. The interpolation circuit 48 generates a command signal to the servomechanism circuit 50 which is also responsive to a feed back signal on line 51 and produces an error signal to a slide driver 52. The slide driver controls the operation of a machine slide 54 which is mechanically connected to a feedback element 56. The feedback element monitors the motion of the machine slide and generates the feedback signal on the line 51 as a function of said motion.

In the preferred embodiment, the invention is used in association with a thread cutting process executed on a turning machine. In this situation, a single point thread cutting tool 58 moves relative to a rotating workpiece 60 which is held in a spindle 62. A spindle transducer 64 is mechanically connected to the spindle 62 and produces signals back to the feed rate control circuit 48.

In a threading process, it is necessary to synchronize the motion of the cutting tool 58 along an axis parallel to the center line of the workpiece 60 with the rotation of the spindle 62. To accomplish this, the spindle transducer 64 generates a signal back to the feed rate control circuit 48 which creates two further signals. A first signal represents the angular velocity of the spindle, and a second signal is an index or gating pulse which is generated once every revolution of the spindle. A thread is cut by making a number of passes of the thread cutting tool over the workpiece 60. With each thread cutting pass, the tool is initially brought to approximately the same position from which the thread cutting pass is started. The index pulse is used to initiate the thread cutting pass, therefore, the thread cutting tool will initially contact the rotating workpiece at the same angular position with each thread cutting pass.

The elements described thus far are shown in the prior art and represent the starting point from which the present invention is made. As discussed earlier, the elements described thus far have the disadvantage that a change in the velocity of the cutting tool from one machining pass to another will result in a different following error. Therefore, even though a machining pass is initiated from the same starting point with the index pulse, the different following error will cause the cutting tool to intially contact the rotating workpiece at a different angular position. Therefore, the cutting tool will not track a previously cut thread groove, and the thread will be ruined.

To overcome the above-mentioned disadvantage, and permit different cutting tool velocities between machining passes, the invention provides a following error compensation program 68 which is part of the data preparation program 34. The purpose of the program 68 is to determine the difference in following error between a first machining pass and a subsequent machining pass and modify the starting point of the next machining pass as a function thereof. For example, assume a thread has been cut by means of a series of iterative rough thread cutting passes at a relatively low spindle speed, and it is desired to make a final thread cutting pass at a higher spindle speed to improve the finish of the thread. Before the final thread cutting pass is executed the disclosed apparatus determines the difference in velocities between a roughing pass and the final thread cutting pass and calculates the difference in the following errors therebetween. The cutting tool is then displaced an amount proportional to the difference in following errors. The direction of displacement is determined by the direction of change in following errors. If the following error has increased, the cutting tool is moved closer to the workpiece; and if the following error has decreased, the cutting tool is moved away from the workpiece.

Figures 2, 3:
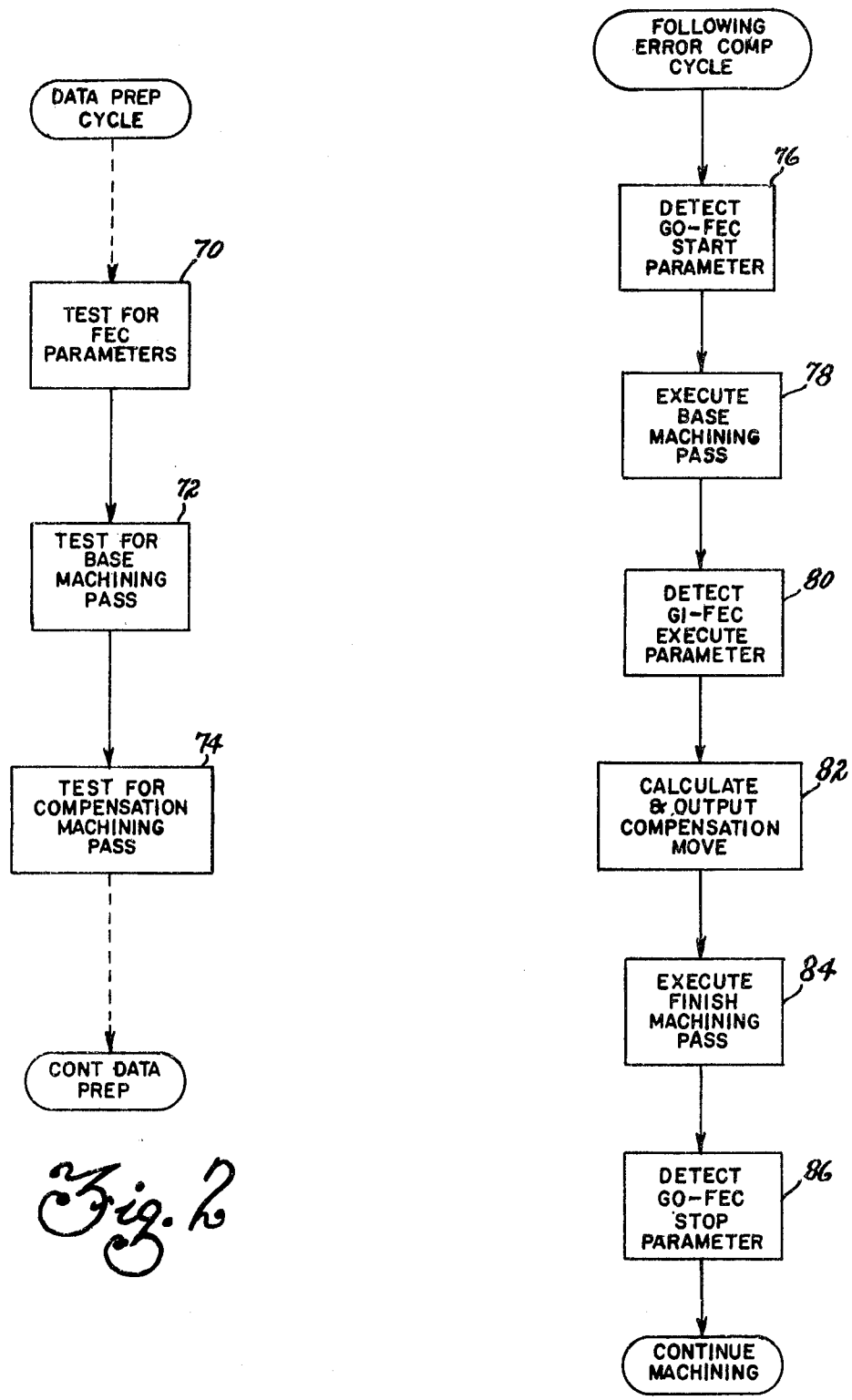
FIG. 2 is a flow chart illustrating the general steps required by the data preparation program in executing a following error compensation cycle.
FIG. 3 is a flow chart of the sequence of steps that comprise a following error compensation cycle.

FIG. 2 is a flow chart illustrating the general tests made by the data preparation program. The numerical control continuously cycles through the data preparation program in servicing the functions which are required during a machine operation. Many functions may be processed simultaneously; and after a number of cycles of the data preparation program, the data required for a particular function is determined and output via the operating system program.

In FIG. 2, block 70 tests for the following error compensation parameters. These parameters control the operation of the compensation cycle and will be discussed in more detail later. Block 72 tests for a base machining pass. In order to execute the following error compensation, a reference following error must be established from which the amount of compensation is determined. Therefore, one of the machining passes is chosen as the base pass, and the following error during the base machining pass is used as a reference value for the following error compensation of subsequent machining passes.

Process block 74 tests for a compensation machining pass. After the base pass has been executed, any of the subsequent machining passes may be selected for compensation. The difference in following error between the base and a subsequent machining pass is determined, and the cutting tool is moved through a near displacement equal to said difference. Thereafter, the subsequent machining pass is executed; and the cutting tool will contact the workpiece at the same angular position as during the base pass.

FIG. 3 is a flow chart illustrating the general sequence of steps that comprise a following error compensation cycle.

The first process step 76 requires the detection of a following error compensation cycle start signal. After the detection of the start signal, process step 78 requires the execution of the base pass. During the execution of the base pass, information defining the velocity of the cutting tool is stored. This information may be generated by measuring the actual velocity of the machine slide holding the cutting tool or the information may be obtained from the programmed input information defining said velocity. Next, process step 80 detects an execute compensation signal which initiates the actual following error compensation.

In the example of a thread cutting operation, a number of roughing passes may be necessary before the compensated finish thread cutting passes are made. The compenation start signal of step 76 may be programmed in conjunction with any one of the roughing passes. However, the execute compensation signal of step 80 must occur before the first finish thread cutting pass in which the following error changes.

Process step 82 calculates a compensation signal representing the difference in following error caused by the difference in velocities between the base pass and a programmed but unexecuted finish pass. This compensation signal is transferred to the servomechanism circuits and represents a motion of the cutting tool along a coordinate axis. Process step 84 commands the execution of the finish thread cutting pass after the following error compensaton has been affected. Consequently, during a finish pass, the cutting tool will initially contact the work at the same angular position which was established during the execution of the base pass. After the compensation has been started by the execute compensation signal detected in step 80, it continues for each subsequent machining pass until process step 86 detects a signal which terminates the following error compensation cycle.

Figure 4:
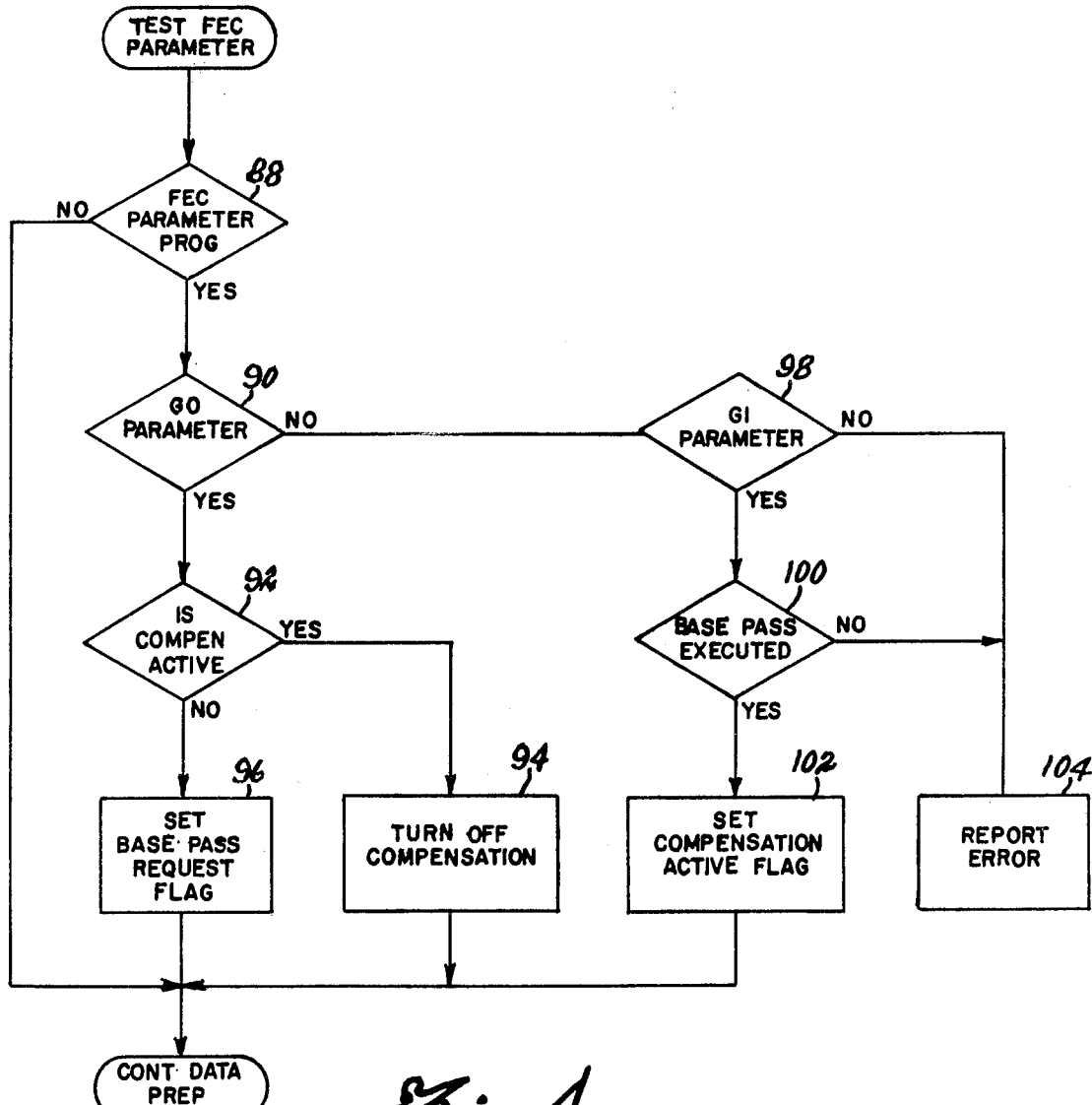
FIG. 4 is a detailed flow chart of a routine for testing for following error compensation parameters.

FIG. 4 is a flow chart of a routine illustrating the steps for testing the following error compensation parameters. These parameters start and stop the following error compenation cycle and control the actual execution of the compensation. First, decision block 88 determines whether or not a following error compensation parameter has been programmed.

In programming the following error compensation codes using the numerical control described in FIG. 1, a special function block of information must be utilized. this special function block may be implemented at any point in a standard part program between the standard blocks of tape defining axis motions and machine functions. However, these special function blocks are literally distinguished from the standard functions blocks by the use of parentheses. The decision block 88 determines whether or not the parenthetical expressions have in fact been programmed. If not, the process continues through the standard data preparation cycle. If they have, the process continues to decision block 90 which detects a G0 which is programmed within the parenthetical expression and is used to start and stop the following error compensation cycle.

If the G0 code is detected, the process moves to decision block 92 which determines whether or not the compensation is active. Since in the disclosed embodiment the G0 code is used to turn the compensation on and off, if the compensation is active, the presence of a G0 code is used to turn off the compensation via process block 94. If the compensation is not active, the G0 code sets a base pass request flag as defined in process block 96.

Returning to decision block 90, if the programmed parameter is not a G0, decision block 98 determines whether or not it is a G1. If the programmed parameter is neither a G0 or a G1, an error is reported via process block 104. If decision block 98 detects a G1, decision block 100 determines whether or not a base pass has been executed. If the base pass which establishes a reference following error has not occurred, a G1 code cannot initiate the compensation span. Therefore, upon decision block 100 detecting no base pass, process block 104 will report an error condition. If the base pass has been executed, process block 102 sets a compensation active flag.

FIG. 5 is a detailed flow chart of a routine illustrating the steps required in testing for a base machining pass. Decision block 106 determines whether or not a threading span has been programmed. In the preferred embodiment, after the following error compensation cycle has been initiated, it remains dormant until a threading span is programmed. Therefore, if decision block 106 does not detect a subsequent threading span, the process continues in the standard data preparation cycle. If the threading span is detected, the process moves to decision block 108 which determines whether or not the base pass request flag is set. If not, the process continues in the standard data preparation program. If it is, the process moves on to process block 110 which calculates axis motion values for a threading pass in a manner heretofore known in the art. Specifically, input position and velocity signals are used to generate command signals representing the axis motion values which are transferred to the servomechanism circuit.

Process block 112 stores whatever factors are relevant to the determination of velocity of the cutting tool. The stored number may represent a programmed velocity lead, spindle speed or any combination thereof. Process block 116 transfers these threading values to the feed rate control circuits 48. Consequently, the servomechanism moves the tool through the base thread cutting pass which accomplishes two things. First, an initial contact point of the cutting tool relative to an angular position of the workpiece is established. The object of the invention is to maintain this initial contact point for all the thread cutting passes regardless of the velocity of the cutting tool. Second, a following error from which subsequent thread cutting passes may be referenced is determined.

FIG. 6 is a detailed flow chart illustrating the steps required to test for a compensation machining pass. Decision block 118 determines whether or not a threading span has been programmed; and if not, the process continues through the data preparation program. If a threading span has been programmed, decision block 120 determines whether or not the compensation active flat is set. If it is not set, the process continues through the standard data preparation program. If the flag is set, decision block 122 determines whether or not the compensation span has been executed. If a compensation span has not been executed, process block 124 calculates the compensation dimension.

The compensation dimension may be calculated in any one of a number of ways. By dimensional definition, the following error is equal to the quotient of the velocity in inches per minute divided by the gain or the velocity constant of the servomechanism circuit as measured in inches per minute per 0.001 inches. In the preferred embodiment, it is assumed that the gain of the servomechanism is constant, and this constant may be permanently stored in the computer. However, as will be appreciated by those who are skilled in the art, if there are appreciable differences in the gain during the operation of the machine, the gain of the servomechanism may be measured and stored during the execution of the base pass. Therefore, the difference in following error may be determined by calculating the following error during the base pass and subtracting therefrom the following error to be expected during the finish pass. Similarly, the difference in velocities between the base and finish passes may be calculated; and this difference divided by the velocity constant of the servomechanism circuit.

In a typical threading program, the velocity of the cutting tool is not directly programmed; however, the lead of the thread or the displacement of the cutting tool relative to the rotation of the workpiece is programmed as well as the desired angular velocity of the spindle. Dimensionally, velocity is determined by the product of the lead times the angular velocity of the spindle. Further, in cutting a thread, the lead will remain constant from the roughing to the finish thread cutting passes. Therefore, during the roughing or base thread cutting pass, only the angular velocity of the spindle need be stored. Again, the stored number may represent the programmed angular velocity or the result of an actual measurement of angular velocity. When the input information defining the finish thread cutting pass is processed, the difference in angular velocities between the rough thread cutting pass and the finish thread cutting pass is determined; and this difference is multiplied by the lead and divided by the velocity constant of the servomechanism circuit to determined the difference in following errors between the roughing and finish thread cutting passes. Obviously, with servomechanisms having a gain of one, the division by the velocity constant is not required. The exact technique used to calculate the compensation dimension in process block 124 is a function of an individual system designer. Therefore, any particular calculation technique disclosed herein is not to be considered a limitation on the invention.

After the compensation dimension has been determined in block 124, process block 126 transfers this dimension to the feed rate control circuits which in turn cause the interpolation circuit to generate command signals corresponding thereto. These command signals cause the servomechanism circuit to move the tool through a displacement corresponding to the calculated difference in following error.

If decision block 122 determines that the compensation span has already been executed, process block 128 calculates the axis motion values required for making the finish thread cutting pass. Process block 132 transfers the threading values to the feed rate control circuit. This causes the finish thread cutting pass to be executed at a different velocity from the base thread cutting pass, however, the execution of the compensation span will cause the cutting tool to initially contact the work at the same angular position as was defined by he base thread cutting pass.

While the invention has been illustrated in some detail according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. A turning machine and a numerical control system of the type wherein a cutting tool initially contacts a rotating workpiece at the same angular position in response to a constant following error during successive machining passes, said numerical control responding to input signals for generating command signals to cause a servomechanism circuit to control the motion of the cutting tool relative to the workpiece, said input signals including a position signal representing a change of position of the cutting tool along an axis of motion and a velocity signal representing the velocity of the cutting tool during a machining pass, wherein the improvement comprises:
(a) means responsive to first position and velocity signals for generating first command signals to cause the servomechanism circuit to move the cutting tool through a first machining pass whereby the cutting tool initially contacts the workpiece at a first angular position of the workpiece;
(b) means responsive to the first velocity signal and a subsequent velocity signal for producing a compensation signal, said compensation signal representing a change in the following error caused by the difference between the first and subsequent velocity signals;
(c) means responsive to the compensation signal for generating second command signals to cause the servomechanism circuit to move the cutting tool through a displacement defined by the compensation signal; and
(d) means responsive to a subsequent position signal and the subsequent velocity signal for generating third command signals to cause the servomechanism circuit to move the cutting tool through a subsequent machining pass whereby the cutting tool initially contacts the rotating workpiece at the first angular position of the workpiece.

2. A turning machine and numerical control combination of the type maintaining synchronization between a cutting tool and an angular position of a rotating workpiece in response to a constant velocity of the cutting tool during successive thread cutting passes said numerical control generating command signals in response to input signals to cause a servomechanism circuit having an approximately constant gain to move the cutting tool through thread cutting passes relative to the rotating workpiece with a following error dependent on the velocity of the cutting tool, said input signals including a position signal defining a change in position of the cutting tool along an axis of motion, a lead signal defining the displacement of the cutting tool relative to the rotating workpiece, an angular velocity signal representing the angular velocity of the rotating workpiece and control signals wherein the improvement comprises:
(a) means for detecting a first control signal for initiating a following error compensation cycle;
(b) means responsive to first position, lead and angular velocity signals for generating first command signals to cause the servomechanism circuit to move the tool through roughing thread cutting passes whereby the cutting tool initially contacts the rotating workpiece at a first angular position thereof;
(c) means for detecting a second control signal to initiate following error compensation of subsequent thread cutting passes;
(d) means responsive to the first lead and angular velocity signals and subsequent lead and angular velocity signals for generating a compensation signal representing the difference in following errors corresponding to the difference between the first and the subsequent lead and angular velocity signals;
(e) means responsive to the compensation signal for generating second command signals to cause the servomechanism circuit to move the cutting tool through a displacement defined by the compensation signal; and
(f) means responsive to a subsequent position signal and the subsequent lead and angular velocity signals for generating third command signals to cause the servomechanism circuit to move the cutting tool through a subsequent thread cutting pass whereby during the subsequent thread cutting pass the cutting tool initially contacts the rotating workpiece at the first angular position of the workpiece; and
(g) means for detecting a third control signal to terminate the operation of the following error compensation cycle.

3. The apparatus of claim 2 wherein the means for calculating a compensation signal further comprises means for multiplying the gain of the servomechanism circuit by the difference in velocities between the first and subsequent thread cutting passes as defined by the first and subsequent lead and angular velocity signals respectively.

4. A method for use with a turning machine and numerical control system of the type wherein a cutting tool initially contacts a rotating workpiece at the same angular position in response to a constant following error during successive machining passes of the tool past the workpiece, said numerical control responding to input signals for generating command signals to cause a servomechanism circuit to control the motion of the cutting tool relative to the workpiece, said input signals including a position signal representing a change of position of the cutting tool along an axis of motion and a velocity signal representing a velocity of the cutting tool during a machining pass, the improvement comprising the steps of:
(a) generating, in response to first position and velocity signals, first command signals to cause the servomechanism circuit to move the cutting tool through a first machining pass whereby the cutting tool initially contacts the workpiece at a first angular position of the workpiece;
(b) producing a compensation signal in response to the first and a subsequent velocity signal, said compensation signal representing a change in the following error corresponding to the difference between the first and subsequent velocity signals;
(c) generating, in response to the compensation signal, second command signals to cause the servomechanism circuit to move the cutting tool through a displacement defined by the compensation signal; and
(d) generating, in response to the subsequent velocity signal and a subsequent position signal, third command signals to cause the servomechanism circuit to move the cutting tool through a subsequent machining pass whereby the cutting tool initially contacts the rotating workpiece of the first angular position of the workpiece.

5. A method for use with a turning machine and a numerical control system of the type wherein a cutting tool initially contacts a rotating workpiece at the same angular position in response to a constant following error during successive machining passes of the cutting tool past the workpiece, said numerical control responding to input signals for generating command signals to cause a servomechanism circuit having an approximately constant gain to control the motion of the cutting tool relative to the workpiece said input signals including a position signal representing a change of position signal representing a change of position of the cutting tool along an axis of motion and a velocity signal representing the velocity of the cutting tool during a machining pass, wherein the improvement comprises the steps of:

(a) generating, in response to first position and velocity signals, first command signals to cause the servomechanism circuit to move the cutting tool through a first machining pass whereby the cutting tool intially contacts the rotating workpiece at a first angular position of the workpiece;

(b) producing, in response to the first and a subsequent velocity signal, a first signal representing the difference between the first and subsequent velocity signals;

(c) producing, in response to the first signal, a compensation signal representing a difference in the following errors corresponding to the difference between the first and subsequent velocity signals;

(d) generating, in response to the compensation signal, second command signals to cause the servomechanism circuit to move the cutting tool along the axis of motion through a displacement defined by the compensation signal;

(e) generating, in response to the subsequent velocity signal and a subsequent position signal, third command signals to cause the servomechanism circuit to move the cutting tool through a subsequent machining pass with a second following error whereby the cutting intially contacts the rotating workpiece at the first angular position of the workpiece; and (f) iterating steps (b) through (e) in response to further position and velocity signals.

6. A method for use with a turning machine and numerical control system of the type wherein a cutting tool initially contacts a rotating workpiece at the same angular position in response to a constant following error during successive machining passes of the cutting tool past the workpiece, said numerical control responding to input signals for generating command signals to cause a servomechanism circuit having an approximately constant gain to control the motion of the cutting tool relative to the workpiece, said input signals including control signals, a position signal representing a change of position of the cutting tool along an axis of motion and velocity signal representing the velocity of the cutting tool during a machining pass, wherein the improvement comprises the steps of:

(a) detecting a first control signal to initiate the start of a following error compensation cycle;

(b) generating, in response to first position and velocity signals, first command signals to cause the servomechanism circuit to move the cutting tool through a first machining pass whereby the tool initially contacts the rotating workpiece at a first angular position of the workpiece;

(c) detecting a second control signal to initiate a compensation of subsequent machining passes for changes in the following error from the first machining pass;

(d) producing a compensation signal in response to the first and a subsequent velocity signals, said compensation signal representing a change in following error caused by the difference between said first and subsequent velocities;

(e) generating, in response to the compensation signal, second command signals to cause the servomechanism to move the cutting tool along the axis of motion through a displacement defined by the compensation signal;

(f) generating, in response to the subsequent velocity signal and a subsequent position signal, third command signals to cause the servomechanism circuit to move the cutting tool through a subsequent machining pass whereby the cutting tool initially contacts the rotating workpiece at the first angular position of the workpiece;

(g) iterating steps (d) through (f) to cause the cutting tool to initially contact the rotating workpiece at the first angular position during subsequent machining passes independent of the velocity of the cutting tool during said passes; and (h) detecting a third control signal to end the following error compensation cycle.

7. A method for use with a turning machine and numerical control system of the type maintaining synchronization between a cutting tool and threading start point defined by an angular position of the rotating workpiece in response to a constant following error during successive thread cutting passes, said numerical control generatng command signals in response to input signals for causing a servomechanism circuit having an approximately constant gain to move the cutting tool through the thread cutting passes relative to the rotating workpice with a following error dependent on the velocity of the cutting tool, said input signals including a position signal defining a change in the position of the cutting tool along an axis of motion, a lead signal representing the displacement of the tool relative to the rotation of the workpiece, an angular velocity signal representing the angular velocity of the rotating workpiece and control signals, wherein the improvement comprises the steps of:

(a) generating, in response to first position, lead and angular velocity signals, first command signals to cause the servomechanism circuit to move the cutting tool through a first thread cutting pass whereby the cutting tool initially contacts the rotating workpiece at a threading start point defined by a first angular position of the workpiece;

(b) generating a compensation signal in response to the first lead and angular velocity signals and subsequent lead in angular velocity signals, said compensation signal representing the difference in following errors corresponding to the difference between the first and subsequent lead and angular velocity signals;

(c) generating, in response to the compensation signal, second command signals to cause the servomechanism circuit to move the cutting tool through a displacement defined by the compensation signal; and (d) generating, in response to the subsequent lead and angular velocity signals and a subsequent position signal, third command signals to cause the servomechanism circuit to move the cutting tool through a subsequent thread cutting pass whereby the cutting tool initially contacts the rotating workpiece at the threading start point defined by the first angular position of the workpiece.

8. The method of claim 7, wherein the step of generating a compensation signal further comprises the step of multiplying the gain of the servomechanism circuit by the difference in the velocities between the first and subsequent thread cutting passes as defined by the differences between the first and subsequent lead and angular velocity signals, respectively.

9. The method of claim 8, wherein the step of generating the compensation signal further comprises the steps of:
(a) calculating a first velocity signal by multiplying the first lead signal times the first angular velocity signal;
(a) generating a second velocity signal by multiplying the subsequent lead signal times the subsequent angular velocity signal;
(c) algebraically subtracting the second velocity signal from the first velocity signal to produce a difference signal; and
(d) multiplying the difference signal times the gain of the servomechanism circuit to produce the compensation signal.

10. The method of claim 9 wherein the improvement further comprises the step of repeating the step of generating first command signals a predetermined number of times.

11. The method of claim 10 wherein before the step of generating a compensation signal, the improvement further comprises the step of detecting a first control signal to initiate a compensation of subsequent thread cutting passes for differences in the following error from the first thread cutting pass.

12. The method of claim 11 wherein the improvement further comprises the step of iterating steps (b) through (d) a predetermined number of times to cause the cutting tool to initially contact the workpiece at the threading start point during each thread cutting pass independent of the subsequent angular velocity signals.

13. The method of claim 12 wherein the improvement further comprises the step of detecting a second control signal to terminate a following error compensation cycle.

14. The method of claim 13 wherein before the step of generating first command signals the improvement further comprises the step of detecting a third control signal for initiating the following error compensation cycle.

* * * * *